Oct. 27, 1959
B. L. HAVENS
COUNTING REGISTER EMPLOYING
PLUS-AND-MINUS ADDER MEANS
2,910,240
Filed Sept. 28, 1954
4 Sheets-Sheet 2
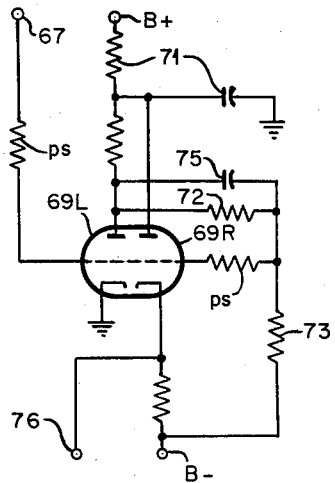
FIG. 2A
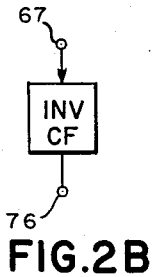
FIG. 2B
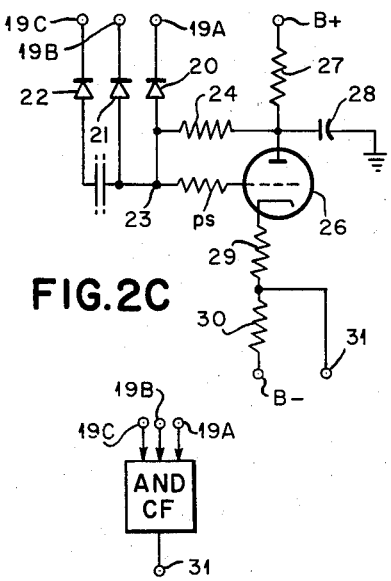
FIG. 2C
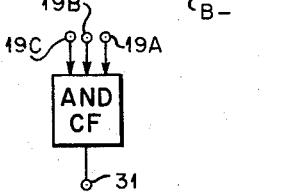
FIG. 2D
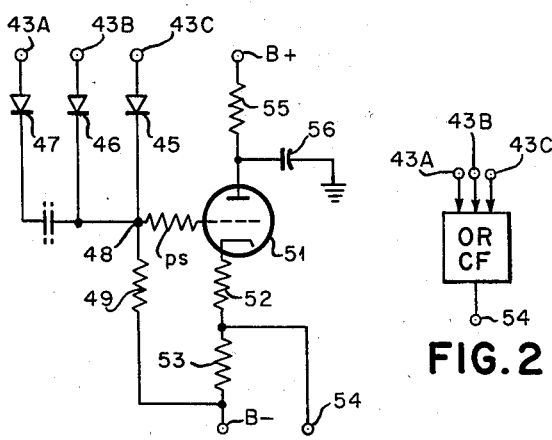
FIG. 2G
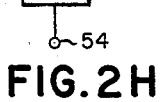
FIG. 2H
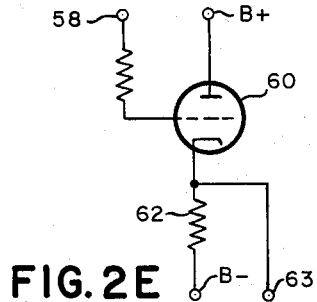
FIG. 2E
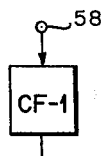
FIG. 2F
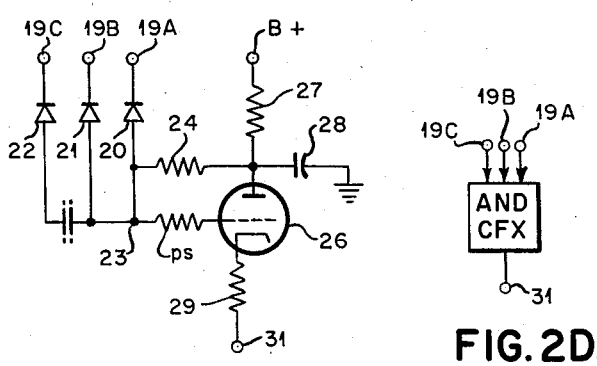
FIG. 2CA
FIG. 2DA
INVENTOR.
BYRON L. HAVENS
BY Wesley De Bruin
ATTORNEY

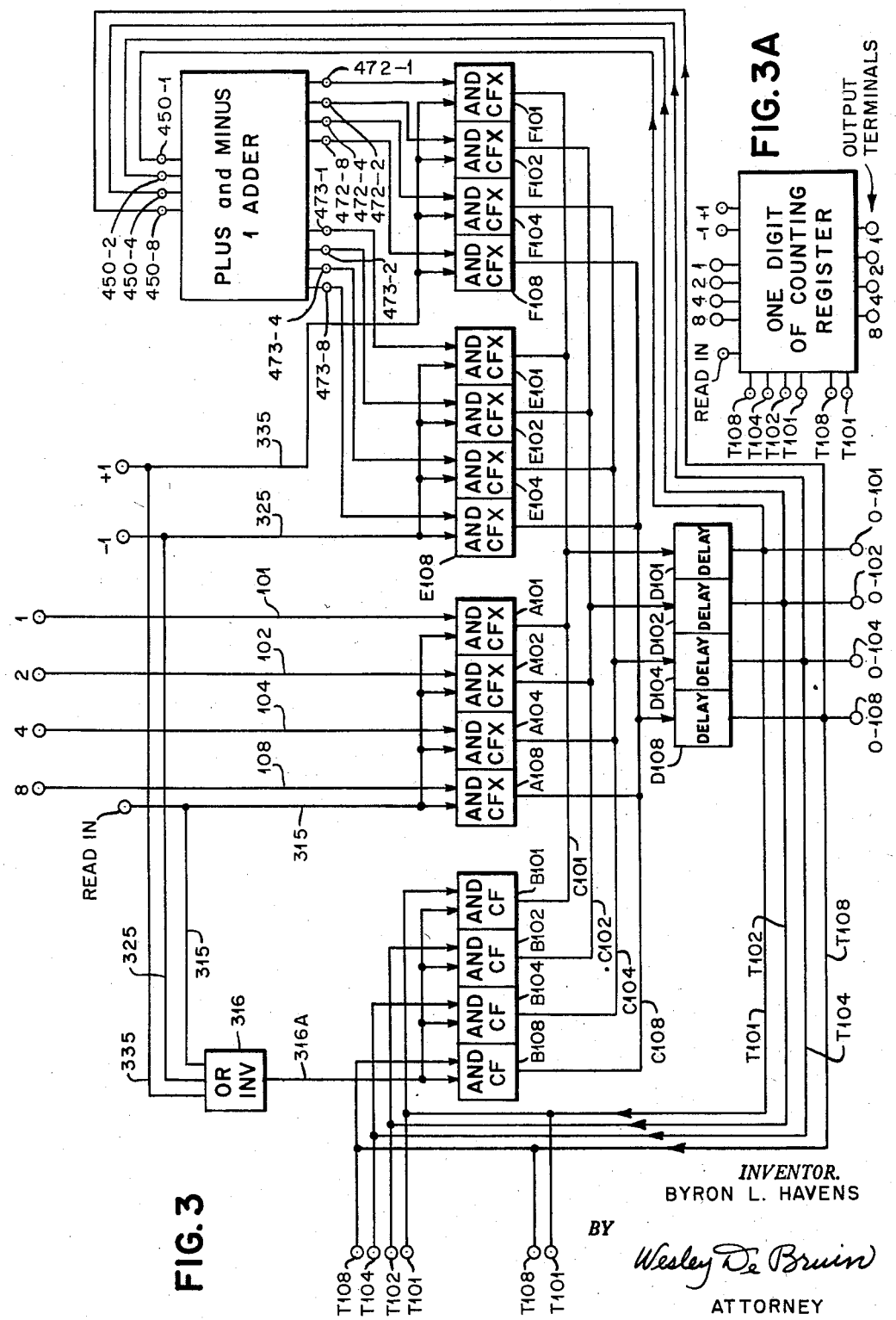

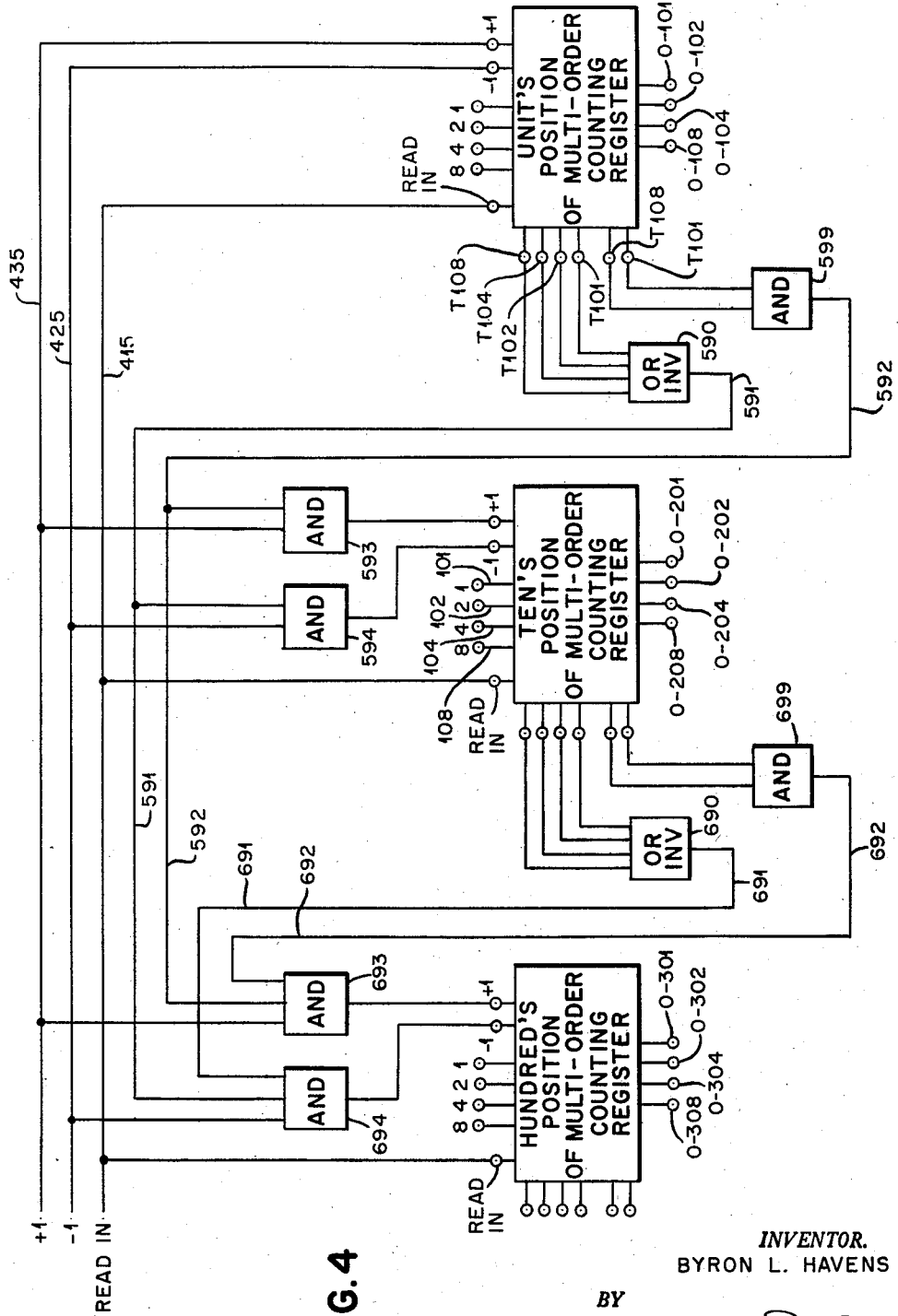

United States Patent Office 2,910,240
Patented Oct. 27, 1959

2,910,240

COUNTING REGISTER EMPLOYING PLUS-AND-MINUS ADDER MEANS

Byron L. Havens, Closter, N.J., assignor to International Business Machines Corporation, New York, N.Y., a corporation of New York Application September 28, 1954, Serial No. 458,909

24 Claims. (Cl. 235—174)

This invention relates to an improved multi-order counting register employing a novel plus-and-minus-1 adder. The multi-order counting register will accept a multi-order decimal quantity and count either up or down and retain in storage any intermediate value or the final value.

The novel plus-and-minus-1 adder will accept an input quantity and render a first output quantity equal to said input quantity plus 1, and a second output quantity equal to said input minus 1.

Further, a single order of said multi-order counting register may be utilized as a storage register for accepting any decimal input of 0 through 9 and rendering any desired decimal output of 0 through 9 at a subsequent time.

A primary object of the present invention is a counting register accomplishing simultaneous carry between orders.

A second object of the present invention is a novel counting register capable of accepting an input and counting up or down from said input and having available at all times the quantity stored in said register.

A third object of the present invention is a novel plus-and-minus-1 adder capable of accepting any decimal input of 0 through 9 and subsequently simultaneously manifesting a decimal output of one less than said input and a second decimal output of one greater than said input.

A still further object of the present invention is a novel storage register capable of accepting a decimal input and subsequently rendering an output, equal to, less than, or greater than, said input.

A still further object of the present invention is a counting register that is simple and economical to construct and reliable in operation.

A yet further object of the present invention is a novel plus-and-minus-1 adder that is simple and economical to construct and reliable in operation.

Additional objects of the above invention are a novel plus-and-minus-1 adder, and a novel multi-order counting register, each capable of accepting an input in binary-decimal notation, parallel by bit and rendering an output in binary-decimal notation, parallel by bit.

Yet further objects of the present invention are a novel plus-and-minus-1 adder, and a novel multi-order counting register that may each be readily adapted to function in a system employing a radix or base other than 10.

Other objects of the invention will be pointed out in the following description and claims and illustrated in the accompanying drawings, which disclose, by way of example, the principle of the invention and the best mode, which has been contemplated, of applying that principle.

Fig. 2A is a detailed circuit diagram of an inverter circuit of the cathode follower type employed in the plus-and-minus-1 adder, the single position register, and the multi-order counting register;

Fig. 2B is a block diagram representation of the inverter circuit of Fig. 2A;

Fig. 2C is a detailed circuit diagram of an And circuit of the cathode follower type that may be employed in the plus-and-minus-1 adder, the single position register, and the multi-order counting register;

Figures 1, 2:
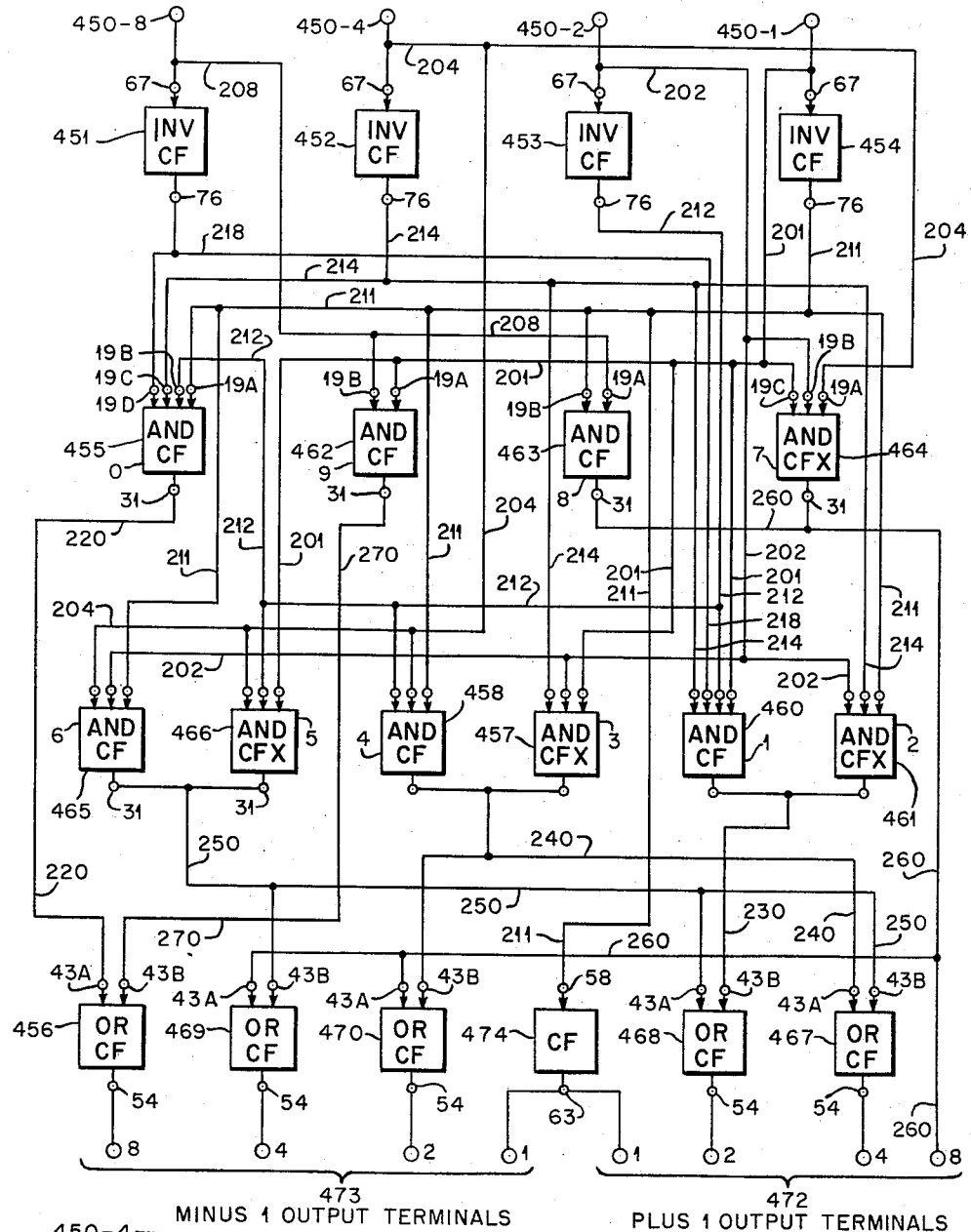
Fig. 1 is a logical circuit diagram of the plus-and-minus-1 adder.
Fig. 2 is a block diagram representation of the plus-and-minus-1 adder shown in Fig. 1.

Fig. 2CA is a detailed circuit diagram of an And circuit that is employed in conjunction with the And circuit of Fig. 2C in the plus-and-minus-1 adder, the single position register, and the multi-order counting register;

Fig. 2D is a block diagram representation of the And circuit of Fig. 2C;

Fig. 2DA is a block diagram representation of the And circuit of Fig. 2CA;

Fig. 2E is a detailed circuit diagram of a cathode follower circuit that may be employed in the plus-and-minus-1 adder, the single position register, and the multi-order counting register;

Fig. 2F is a block diagram representation of the cathode follower circuit of Fig. 2E;

Fig. 2G is an Or circuit of the cathode follower type that may be employed in the plus-and-minus-1 adder, the single position register, and the multi-order counting register;

Fig. 2H is a block diagram representation of the Or circuit of Fig. 2G;

Fig. 3 is a logical circuit diagram of the single position register which is capable of counting up or down;

Fig. 3A is a block diagram representation of the single position register of Fig. 3; and Fig. 4 is a logical circuit diagram of the multi-order counting register employing a plurality of single position (or one digit) registers of the type shown in Fig. 3.

Briefly, the plus-and-minus-1 adder shown in Fig. 1 and represented by the block shown in Fig. 2, will accept a digit input of 0 through 9 expressed in binary-decimal notation, parallel by bit, and render a quantity that is 1 plus the digit input. This quantity will be expressed in binary-decimal notation, parallel by bit. The plus-and-minus-1 adder will also render an output that is 1 less than the digit input and this quantity also will be manifested in binary-decimal notation, parallel by bit. Briefly, the novel plus-and-minus-1 adder has a group of four input terminals consisting of a 1 bit, a 2 bit, a 4 bit and an 8 bit terminal, a group of four minus 1 output terminals consisting of a 1 bit, a 2 bit, a 4 bit and an 8 bit terminal, and a group of four plus 1 output terminals consisting of a 1 bit, a 2 bit, a 4 bit and an 8 bit terminal.

Briefly, the single position counting register (one digit counting register) shown in Fig. 3 and represented by the block shown in Fig. 3A, will accept any decimal input of 0 through 9 expressed in binary-decimal notation, parallel by bit and count up or down from said input, counting only however, through an absolute value of 10. The single position register will retain in storage the input, or any decimal value arrived at by counting up, or counting down, or a combination of both. The single position register will make available the decimal value stored therein at a group of four output terminals in parallel by bit order. That is, the one digit counting register, for convenience hereinafter frequently referred to as a single position register, has a group of four input terminals consisting of a 1 bit terminal, a 2 bit terminal, a 4 bit terminal and an 8 bit terminal and a group of four output terminals consisting of a 1 bit terminal, a 2 bit terminal, a 4 bit terminal and an 8 bit terminal.

Briefly, the multi-order counting register of Fig. 4 employs a plurality of single position registers of the type shown in Fig. 3 and represented by the block shown in Fig. 3A. The plurality of single position registers are selectively controlled by the proper interconnection of a group of master control leads and coincidence circuit means connected between the output of a lower order register or registers, the master control leads, and the input of the next higher order register. The multi-order counting register is capable of accepting as an input a multi-order decimal quantity and counting either up or down, or a combination of both. Further, the multi-order counting register is capable of retaining in storage the input quantity of any quantity arrived at by counting up, down, or any combination of both.

A feature of the novel register herein disclosed and claimed is simultaneous carry time.

Briefly, the novel multi-order counting register has a group of four input terminals consisting of a 1 bit, a 2 bit, a 4 bit and an 8 bit terminal and a group of four output terminals consisting of a 1 bit, a 2 bit, a 4 bit and an 8 bit terminal for each order, i.e., single position register.

Reference is made to U.S. patent application of Byron L. Havens et al., Serial No. 257,747, filed November 23, 1951, now Patent No. 2,782,305, and entitled "Digital Information Register."

For purposes of clarity and consistency a number of definitions of terminology and symbols will be set forth:

In the binary notation only two digits are employed, i.e., 0 and 1. The decimal digit 0 is represented by binary digit 0 and the decimal digit 1 is represented by binary digit 1. These binary digits are referred to as bits. The digital positions or orders in a binary number, reading from right to left, correspond in value to $2^0$, $2^1$, $2^2$, $2^3$, $2^4$, etc., or decimal digits 1, 2, 4, 8, 16, etc. respectively. For example, binary number 1001 represents decimal digit 9 which is determined by the addition of decimal digits 1 and 8 indicated by a binary 1 in the extreme right and the left binary positions respectively. Hence, by using binary bits or pulses in groups of four wherein a pulse represents a binary 1 and the absence of a pulse represents a binary 0, any decimal digit from 0 through 9 inclusive may be written in the pure binary notation.

The system of representing decimal numbers, digit for digit, in the pure binary notation is referred to herein as the binary-decimal system. The four consecutive binary orders, reading from right to left, represent the decimal digits 1, 2, 4 and 8 for the units decimal order and are accordingly referred to as the 1 bit, 2 bit, 4 bit and 8 bit, respectively. It follows that the four binary orders of the tens decimal order represent the decimal digits 10, 20, 40 and 80 respectively. Likewise, in subsequent decimal orders, for example, the four respective binary orders of the hundreds decimal order represent the decimal digits 100, 200, 400 and 800 respectively.

The term "binary coded decimal system" is defined in the standards on electronic computers: definition of terms, 1950 Proceedings of the IRE (50 IRE 8.S1).

As an example, 459 will be represented in the binary-decimal system by 0100, 0101, 1001. The four binary bits at the right represent the decimal digit 9 of the units order, the next four bits to the left represent the decimal digit 5 of the tens order, and the four bits at the extreme left represent the decimal digit 4 of the hundreds order.

Any decimal number from 0–15 inclusive can be represented by a group of four binary bits. However, in the binary-decimal system, only the decimal digits (0–9 inclusive) are represented by each group of four binary bits.

Various circuits used herein or particular points within the circuits are frequently referred to as Up or Down. Up means that the voltage present at the particular point or at the output of the circuit designated is positive with respect to ground. Down means that the voltage present at the particular point or at the output of the circuit designated is negative with respect to ground.

Numerous coincidence circuits are employed herein. An And circuit refers to a circuit which is operable to produce a positive voltage at its output terminal only when all of the input terminals thereof have a positive voltage applied thereto simultaneously. An Or circuit refers to a circuit operable to produce a positive voltage at its output terminal when only one or a plurality of the input terminals thereof has a positive voltage applied thereto.

When a terminal is referred to as being Up the presence of a binary 1 is indicated. Correspondingly, when a terminal is represented as Down the absence of a binary 1 is indicated, i.e., the presence of a binary 0.

*The And circuit of Figs. 2C and 2D.*—Fig. 2C represents an And circuit including input terminals 19A, 19B and 19C, the diodes 20, 21 and 22, the pull-up resistor 24 and the cathode follower tube 26 and its associated circuitry. Input terminal 19A is connected to the cathode of diode 20, input terminal 19B is connected to the cathode of diode 21 and input terminal 19C is connected to the cathode of diode 22. It is to be understood that a greater or lesser number of diodes and associated input terminals can be employed. The anodes of diodes 20, 21 and 22 are connected together to one side of pull-up resistor 24 and through parasitic suppressing resistor PS to the grid of triode tube 26. The other side of pull-up resistor 24 is connected to the plate of triode 26. It will be noted that the plate of triode 26 is connected through decoupling resistor 27 to a positive voltage B+ and through capacitor 28 to ground. The resistor 27 and capacitor 28 together constitute a decoupling circuit between the positive voltage B+ and the anode of the cathode follower. The cathode of the cathode follower tube, namely, triode 26, is connected through resistors 29 and 30 to the negative terminal of the B supply. It will be seen that output terminal 31 is connected to the juncture of resistors 29 and 30, resistors 29 and 30 serving as a voltage dividing network which places the output terminal 31 at the proper potential. Briefly, the And circuit of Fig. 2C functions as follows: if all of the input terminals, namely, 19A, 19B and 19C are Up simultaneously, then the grid of cathode follower tube, triode 26, is Up. This renders triode 26 more conductive and results in output terminal 31 being Up. When one or more of the input terminals, namely, 19A, 19B and 19C are Down, i.e., at approximately −30 volts, the output terminal 31 is Down.

*The And Circuit of Figs. 2CA and 2DA.*—The And circuits of Figs. 2CA and 2C are very similar with the exception that the And circuit of Fig. 2CA omits resistor 30 and its connection to a negative potential B−. Even with this difference the And circuit of Fig. 2CA where utilized, functions in essentially the same manner as that of the And circuit shown in Fig. 2C. The And circuit of Fig. 2CA is used as a member of a group of two or more (wherein output terminals 31 of each member are connected in common) And circuits, where one member is an And circuit of the type shown in Fig. 2C.

*The Or circuit of Figs. 2G and 2H.*—The Or circuit of Fig. 2G includes a plurality of input terminals 43A, 43B and 43C, the diodes 45, 46 and 47, a pull-up resistor 49 and a cathode follower tube, triode 51. Terminal 43A is connected to the anode of diode 47, terminal 43B is connected to the anode of diode 46 and terminal 43C is connected to the anode of diode 45. The cathodes of diodes 45, 46 and 47 are connected together at juncture 48 which is connected through the parasitic suppressing resistor PS to the grid of the tube 51. The cathode of triode 51 is connected through the voltage dividing resistors 52 and 53 to a negative potential B−. Output terminal 54 is connected to the juncture of resistors 52 and 53. The plate of triode 51 is connected through resistor 55 to a positive potential B+ and through a capacitor 56 to ground. Briefly, the Or circuit of Fig. 2G functions as follows: when one or more of the input terminals 43A, 43B and 43C are Up, i.e., at approximately +5 volts, the juncture 48 and consequently the grid of triode 51 is Up. This results in the cathode follower tube being more conductive and causing the output terminal 54 to be Up. Conversely, if all the input terminals are Down, the output terminal 54 is Down. Once again it should be appreciated that a greater or lesser number of input terminals and diodes can be used in an Or circuit of the type shown in Fig. 2G.

*The delay circuits.*—A delay circuit of the type that may be employed to practice the invention is fully disclosed and claimed in Reissue Patent No. 23,699 granted to Byron L. Havens on August 18, 1953. Briefly, the function of the delay circuit is as follows: an input pulse applied to the input terminal of the delay circuit during one preselected time interval produces an output pulse at the output terminal of the delay circuit during the next subsequent time interval. An input pulse may be applied to the input terminal during the same time interval that an output pulse is produced at the output terminal, i.e., the flyback produced by an input pulse is used to set up the output pulse and the circuitry is such that there is complete isolation between the output and input pulses during any given time interval.

At this point it will suffice to appreciate that if the input terminal of the delay circuit is Up during a first microsecond the output terminal of the delay circuit will be Up during the next subsequent microsecond. Further, that if the input terminal of the delay circuit is Up for a first and second microseconds that the output terminal of of the delay circuit will be Up for the second and third microseconds.

*The inverter circuit of Figs. 2A and 2B.*—Fig. 2A illustrates an inverting circuit which produces a negative voltage pulse at its output terminal 76 when a positive voltage pulse is applied to its input terminal 67, and vice versa. In other words, when input terminal 67 is Up, output terminal 76 is Down, and when input terminal 67 is Down, output terminal 76 is Up. Input terminal 67 is connected through the parasitic suppressing resistor PS to the grid of tube 69L. When input terminal 67 is Up, the grid of tube 69L is Up and thus said tube is fully conductive. The anode of tube 69L is connected through the anode load resistor 70 and decoupling circuit 71 to a positive potential B+. Connected between the anode of tube 69L and a negative voltage B— are the voltage dividing resistors, namely, serially connected resistors 72 and 73. The anode of the tube 69L is coupled to the grid of tube 69R. A frequency compensating coupling capacitor 75 is connected in parallel with resistor 72. When input terminal 67 is Up resulting in tube 69L being fully conductive, the anode of said tube is Down causing the grid of tube 69R to be Down. When the grid of tube 69R is Down, the tube is less conductive and output terminal 76 is Down. Tube 69R operates as a cathode follower, the output terminal 76 being connected to the cathode of said tube. When input terminal 67 is Down, tube 69L will be non-conductive and its anode will be at approximately B+ potential. The action of the voltage dividing resistors 72 and 73 causes the grid of cathode follower tube 69R to be Up so that the output terminal 76 is also Up.

*The cathode follower circuit of Figs. 2E and 2F.*—The cathode follower circuit shown in Fig. 2E and represented by the block shown in Fig. 2F may be utilized to practice the invention. However, any suitable cathode follower circuit of a type well known in the art may be employed. The cathode follower circuit may be of the general type shown in Figs. 1I and 1K of the drawing of the U.S. patent application of W. J. Deerhake et al., Serial No. 444,253, filed July 19, 1954, and entitled "Cathode Ray Tube Storage."

It will be readily apparent to those skilled in the art that the invention herein disclosed and claimed is not limited to any particular circuit structure, but that any of a wide variety of And, Or, Inverter, Cathode Follower, and Delay Circuits may be employed to practice the invention. Also that the Or-Inverter circuit utilized in the single position register and the multi-order counting register may be constructed by properly combining the Or circuit of Fig. 2G and the Inverter circuit of Fig. 2A.

Referring to Fig. 1, a logical circuit diagram of the novel plus-and-minus-1 adder is shown. Briefly, the novel adder has three sets of terminals. Each set of terminals has a 1 bit, a 2 bit, a 4 bit and an 8 bit terminal. The set of terminals labeled 450–1 through 450–8 shown in the uppermost portion of Fig. 1 are the input terminals of the plus-and-minus-1 adder. The set of terminals appearing in the lower left of Fig. 1 (bracketed and labeled 473) are the minus 1 output terminals. The set of terminals in the lower right of Fig. 1 (bracketed and labeled 472) are the plus 1 output terminals. The novel plus-and-minus-1 adder will now be explained in detail in conjunction with a number of examples.

*Example No. 1.*—Arbitrarily assume that all four input terminals of the plus-and-minus-1 adder are Down, that is, a decimal value of 0 is impressed on the input terminals. Referring to Fig. 1, it will be seen that with a decimal input of 0, output terminal 76 of each of the inverter circuits 451 through 454 will be Up as will leads 218, 214, 212 and 211 which are respectively connected to the output terminals 76 of the afore-recited inverter circuits. Referring to And circuit 455, it will be seen that leads 211, 212, 214 and 218 are respectively connected to input terminals 19A through 19D of said And circuit. Thus, under the conditions of this example, And circuit 455 will be energized. When And circuit 455 is energized, output terminal 31 and said And circuit will be Up resulting, through the medium of lead 220 and Or circuit 456 in the 8 bit terminal of terminals 473, being Up. Now it will be observed that lead 211, which, under the conditions of this example is Up, is also connected to input terminal 58 of cathode follower 474 resulting in the 1 bit terminal of terminals 472 and the 1 bit terminal of terminals 473 being respectively in the Up condition. When only the 1 bit and 8 bit terminals of terminals 473 are respectively in the Up condition, a decimal value of 9 is manifested, and this is indicative in the decimal system of 1 less (i.e., minus 1) than the decimal input of 0. When only the 1 bit terminal of terminals 472 is Up a decimal value of 1 is manifested, indicating a plus 1 quantity with regard to the input of decimal value 0.

*Example No. 2.*—Assuming a decimal input of 1, i.e., only input terminal 450–1 in the Up condition, it will be seen that output terminal 76 of inverter 454 and lead 211 will be in the Down condition. When lead 211 is in the Down condition And circuit 455, and cathode follower 474 will each be deenergized. Lead 201 will be in the Up condition as will leads 212, 214 and 218. The afore-recited four leads which are in the Up condition are connected to the four input terminals of And circuit 460. Thus And circuit 460 is energized. When And circuit 460 is energized, output terminal 31 of said And circuit will be in the Up condition and through lead 230 and Or circuit 468 will result in the 2 bit terminal of terminals 472 being in the Up condition. All other output terminals will be in the Down condition. Thus it is seen that a decimal input of 1 results in a 0 output by the minus 1 output terminals 473, and an output of decimal value 2 by the plus 1 output terminals 472.

*Example No. 3.*—Assuming a decimal input of 2, i.e., only input terminal 450–2 in the Up condition, it will be seen that output terminal 76 of inverter 453 will be Down as will lead 212. Leads 211, 214 and 218 will be respectively in the Up condition. Now referring to And circuit 461, it will be seen that leads 202, 211 and 214 are respectively connected to the input terminals of said And circuit. (Lead 202 will be in the Up condition as it is directly connected to input terminal 450-2.) Thus, And circuit 461 will be energized resulting, through the medium of lead 230 and Or circuit 468 in the 2 bit terminal of terminals 472, being in the Up condition. Since lead 211 is in the Up condition, cathode follower 474 will be energized and the 1 bit terminals of each of the sets of terminals 472 and 473 will be Up. Thus it is seen that for a decimal input of 2, the minus 1 output terminals 473 having only the 1 bit terminal in the Up condition, manifests an output of decimal value 1, whereas the plus 1 output terminals 472 having both the 1 bit and the 2 bit output terminals simultaneously Up, manifests a decimal value of 3.

*Example No. 4.*—Assuming a decimal input of 3, i.e., only input terminal 450-1 and 450-2 in the Up condition simultaneously, it will be seen that output terminals 76 of inverters 453 and 454 will be Down as will leads 211 and 212 respectively. Lead 214 will be in the Up condition since inverter 452 is not energized under the conditions of this example. Now referring to And circuit 457, it will be seen that the three input terminals of said And circuit are respectively connected to leads 201, 202 and 214. (Leads 201 and 202 are respectively in the Up condition as they are respectively directly connected to input terminals 450-1 and 450-2.) Thus, since all three of the inputs of And circuit 457 are Up the output of said And circuit and lead 240 will be Up. It will be seen that when lead 240 is Up, Or circuits 470 and 467 will each be energized, respectively, resulting in the 2 bit terminal of terminals 473, and the 4 bit terminal of terminals 472 being in the Up condition. (It will be seen that with inverter 454 energized, i.e., a 1 bit input, lead 211 is Down and cathode follower 474 will not be energized.) Thus it is seen that for a decimal input of 3, the minus 1 output terminals 473, having only its 2 bit terminal in the Up condition, manifests an output of decimal value 2, whereas the plus 1 output terminals 472, having only its 4 bit output terminal Up, manifests a decimal value of 4.

*Example No. 5.*—Assuming a decimal input of 4, i.e., only input terminal 450-4 in the Up condition, it will be seen that output terminal 76 of inverter 452 will be Down as will lead 214. Leads 211, 212 and 218 will be respectively in the Up condition. Lead 204 will also be in the Up condition as it is directly connected to input terminal 450-4. Now referring to And circuit 458, it will be seen that the three input terminals of said And circuit are respectively connected to leads 211, 212 and 204. Thus And circuit 458 will be energized and lead 240 will be in the Up condition. When lead 240 is in the Up condition, Or circuits 467 and 470 are respectively energized, resulting respectively, in the 4 bit terminal of terminals 472, and the 2 bit terminal of terminals 473 being in the Up condition. Since lead 211 is in the Up condition, cathode follower 474 will be in the Up condition resulting in the 1 bit terminals of terminals 472 and 473, respectively, being in the Up condition. Thus it will be seen that for a decimal input of 4, the minus 1 output terminals 473, having both its 1 and 2 bit terminals simultaneously in the Up condition manifests a decimal value of 3, whereas the plus 1 output terminals 472, having both its 1 and 4 bit terminals simultaneously in the Up condition, manifests a decimal value of 5.

*Example No. 6.*—Assuming a decimal input of 5, i.e., only input terminals 450-1 and 450-4 simultaneously in the Up condition, it will be seen that output terminals 76 of inverters 452 and 454, respectively, will be in the Down condition, as will leads 211 and 214. Leads 212 and 218 will be in the Up condition, as will leads 201 and 204 which are respectively connected to input terminals 450-1 and 450-4. Now referring to And circuit 466, it will be seen that leads 201, 204 and 212 are respectively connected to the input terminals of said And circuit and result in said And circuit being energized. When And circuit 466 is energized, lead 250 which is connected to the output of said And circuit, will be in the Up condition. When lead 250 is in the Up condition, Or circuits 467, 468 and 469, respectively, will be energized. When Or circuits 467 and 468 are energized, the 2 and 4 bit terminals of terminals 472 are respectively in the Up condition. When Or circuit 469 is energized, the 4 bit terminal of terminals 473 is Up. Thus it is seen that for a decimal input of 5, the minus 1 output terminals 473, having only its 4 bit terminal in the Up condition, manifests an output of decimal value 4, whereas the plus 1 output terminals 472, having both its 2 and 4 bit output terminals simultaneously Up, manifests a decimal value of 6.

*Example No. 7.*—Assuming a decimal input of 6, i.e., only input terminals 450-2 and 450-4 simultaneously in the Up condition, it will be seen that output terminals 76 of inverters 453 and 452 will be Down as will leads 212 and 214. Leads 211, 218, 202 and 204 will respectively be in the Up condition. Now referring to And circuit 465, it will be seen that leads 211, 202 and 204 are respectively connected to the three input terminals of said And circuit. Thus And circuit 465 will be energized and lead 250 will be in the Up condition resulting in an output equal to that of the immediately preceding example (decimal input of 5). However, under the conditions of this example, input terminal 450-1 is Down and thus lead 211 is Up resulting in cathode followed 474 being energized and the 1 bit terminal of terminals 472 and 473, respectively, being Up. Thus, it is seen that for a decimal input of 6 the minus 1 output terminals 473, having both its 1 bit and 4 bit terminals simultaneously in the Up condition, manifests an output of decimal value 5, whereas the plus 1 output terminals 472, having its 1, 2 and 4 bit output terminals simultaneously in the Up condition, manifests a decimal value of 7.

*Example No. 8.*—Assuming a decimal input of 7, i.e., input terminals 450-1, 450-2 and 450-4 respectively in the Up condition, it will be seen that output terminals 76 of inverters 452, 453 and 454 will be respectively in the Down condition as will leads 211, 212 and 214. Leads 218, 201, 202 and 204 will respectively be in the Up condition. Now referring to And circuit 464, it will be seen that leads 201, 202 and 204 are respectively connected to the three input terminals of said And circuit, resulting in said And circuit being energized. When And circuit 464 is energized, its output, and thus lead 260 is in the Up condition. It will be observed that lead 260 is also directly connected to one of the input terminals of each of the Or circuits 469 and 470, and to the 8 bit terminal of the plus 1 output terminals 472. Thus when lead 260 is Up, Or circuits 469 and 470 are energized resulting in the 2 bit and 4 bit output terminals of terminals 473 being Up and the 8 bit terminal of terminals 472 being Up. Thus, it is seen that for a decimal input of 7, the minus 1 output terminals 473, having both its 2 and 4 bit terminals in the Up condition, manifests an output of decimal value 6, whereas the plus 1 output terminals 472, having only its 8 bit terminal in the Up condition, manifests a decimal value of 8.

*Example No. 9.*—Assuming a decimal input of 8, i.e., input terminal 450-8 in the Up condition, it will be seen that output terminal 76 of inverter 451 will be in the Down condition as will lead 218. Leads 211, 212, 214 and 208 will respectively be in the Up condition. Now referring to And circuit 463, it will be seen that leads 211 and 208 are connected to the two input terminals of said And circuit. Thus And circuit 463 will be energized and lead 260 will be in the up condition. As will be recalled from an earlier example, when lead 260 is in the Up condition, the 2 bit and 4 bit terminals of terminals 473 and the 8 bit terminal of terminals 472 will be respectively in the Up condition. Now since lead 211 is Up, cathode follower 474 will be energized and the 1 bit terminals of terminals 472 and 473 will be Up. Thus it is seen that for the decimal input of 8 the minus 1 output terminals 473, having its 1, 2 and 4 bit terminals in the Up condition, manifests an output of decimal value 7, whereas the plus 1 output terminals 472, having its 1 and 8 bit terminals in the Up condition, manifests a decimal value of 9.

*Example No. 10.*—Assuming a decimal input of 9, i.e., input terminals 450–1 and 450–8 respectively in the Up condition, it will be seen that output terminals 76 of inverters 451 and 454 will be respectively in the Down condition as will leads 211 and 218. Leads 212, 214, 201 and 208 will be respectively in the Up condition. Now referring to And circuit 462, it will be seen that leads 201 and 208 are connected to the two input terminals of said And circuit. Further, that lead 270 is connected between the output of said And circuit and input terminal 43B of Or circuit 456. Thus, under the conditions of this example, And circuit 462 will be energized as will Or circuit 456, resulting in the 8 bit terminal of terminals 473 being in the Up condition. All other terminals of terminals 473 and all four terminals of terminals 472 will be respectively in the Down condition. Thus it is seen that for a decimal input of 9 the minus 1 bit terminals 473, having its 8 bit terminal in the Up condition, manifests an output of decimal value 8, whereas the plus 1 output terminals 472, having all of its terminals in the Down condition, manifests a decimal value of 0.

To briefly review what is set forth in detail in the afore-recited examples, the coincidence circuits that are energized for a particular digit input will be set forth below.

Referring to Fig. 1, it will be seen: that for a decimal digit 1 input And circuit 460 will be energized; that for a decimal digit 2 input And circuit 461 and cathode follower 474 will be energized; that for a decimal digit 3 input And circuit 457 will be energized; that for a decimal digit 4 input And circuit 458 and cathode follower 474 will be energized; that for a decimal digit 5 input And circuit 466 will be energized; that for a decimal digit 6 input And circuit 465 and cathode follower 474 will be energized; that for a decimal digit 7 input And circuit 464 will be energized; that for a decimal digit 8 input And circuit 463 and cathode follower 474 will be energized; that for a decimal digit 9 input And circuit 462 will be energized; and for a decimal digit 0 input And circuit 455 and cathode follower 474 will be energized. It will be apparent to those skilled in the art that the above arrangement of coincidence circuit means is only an illustrative embodiment and that many other embodiments may be employed for practising the invention herein disclosed and claimed.

*Single position (i.e., one digit counting register) of multi-digit counting register.*—Referring to Fig. 3, a single position of the novel multi-digit counting register herein disclosed and claimed is shown.

The single position register corresponds identically with the units, tens, and hundreds order register of the multi-order counting register shown in Fig. 4. The single position register of Fig. 3 will now be described in detail.

Leads 315, 325 and 335 of Fig. 3 are respectively the read-in control lead, the minus 1 control lead, and the plus 1 control lead: only one of said leads may be Up at any given time.

Referring to Fig. 3, let it be assumed that during a first microsecond, read-in control lead 315 is Up simultaneously with leads 102 and 104 of input leads 101, 102, 104 and 108 (which are the 1, 2, 4, and 8 bit input leads respectively). (When leads 102 and 104 are simultaneously Up, a decimal value of 6 is manifested.) It will be seen that lead 315, the readin control lead, is connected to the right input of Or-Inverter circuit 316 and to the left input terminals of each of the And circuits A101, A102, A104 and A108. It will also be noted that leads 101, 102, 104 and 108 are respectively connected to the right input terminals of And circuits A101, A102, A104 and A108. Thus when leads 102, 104 and 315 are simultaneously in the Up condition And circuits A102 and A104 will be energized and the output of said And circuits will respectively be in the Up condition. It will be seen that: leads C101, C102, C104 and C108 respectively connect in common, the output of And circuits B101, A101, E101 and F101; B102, A102, E102 and F102; B104, A104, E104 and F104; and B108, A108, E108 and F108. It will also be seen that leads C101 through C108 are respectively connected to the input terminals of delay circuits D101 through D108. Thus it will be apparent that during the second microsecond, the outputs of delay circuits D102 and D104 will be respectively in the Up condition. This is accomplished as a result of leads C102 and C104 each being in the Up condition during a first microsecond and that delay circuits D102 and D104 each effect a one microsecond delay. (Delay circuits D101 through D108 may be respectively of the general type disclosed in the Byron L. Havens Reissue Patent No. 23,699 granted August 18, 1953.) The outputs of delay circuits D101 through D108 are respectively connected to leads T101 through T108. As seen in Fig. 3, leads T101, T102, T104 and T108 are also respectively connected to: the right input terminal of And circuit B101 and input terminal 450–1 of the plus-and-minus-1 adder; the right input terminal of And circuit B102 and input terminal 450–2 of the plus-and-minus-1 adder; the right input terminal of And circuit B104 and input terminal 450–4 of the plus-and-minus-1 adder; and the right input terminal of And circuit B108 and input terminal 450–8 of the plus-and-minus-1 adder. It will thus be apparent that during the second microsecond, leads T102 and T104 will be respectively in the Up condition resulting in an input of decimal value 6 to the plus-and-minus-1 adder.

Now assume that during the second microsecond leads 315, 325 and 335 are respectively in the Down condition. (Note: When all three inputs of Or-Inverter 316 are in the Down condition then the output 316A of said Or-Inverter, which is connected to the left input of each of the And circuits B101, B102, B104 and B108, will be in the Up condition.) Then lead 316A of Or-Inverter circuit 316 will be in the Up condition permitting And circuits B102 and B104 to be energized. Thus during the third microsecond, leads C102 and C104 will respectively be in the Up condition.

Now assuming that during the third and fourth microseconds, leads 315, 325 and 335 respectively remain in the Down condition. Thus, the output of Or-Inverter circuit 316, namely, lead 316A will be in the Up condition during the second, third and fourth microseconds. It is also well to appreciate at this time that during the second, third and fourth microseconds, a decimal value of 5 will appear at the minus 1 output terminals 473 and a decimal value of 7 will appear at the plus 1 output terminals 472 of the plus-and-minus-1 adder. It will be seen that the decimal 5 output of the plus-and-minus-1 adder is impressed on And circuits E101 through E108, i.e., the right input of And circuits E101 and E104 will respectively be in the Up condition during the second, third and fourth microseconds. However, the decimal value of 5 is not transmitted by said And circuits since lead 325, the minus 1 control lead, is in the Down condition throughout the first, second, third and fourth microseconds. As seen in Fig. 3, lead 325 is connected to the center input terminal of Or-Inverter circuit 316 and to the left input terminal of each of the And circuits E101 through E108.

Referring to Fig. 3, it will be seen that lead 335, the plus 1 control lead, is connected to the left input terminal of Or-Inverter circuit 315 and the left input terminals of each of the And circuits F101 through F108. Lead 325 is also Down throughout the first four microseconds and thus the decimal value of 7 manifested by the plus 1 output terminals 472 of the plus-and-minus-1 adder will not be transmitted by And circuits F101 through F108 even though this decimal value of 7 will be manifested by said terminals continually throughout the second, third and fourth microseconds.

From the preceding discussion, it will be apparent that during the fourth microsecond, leads C102 and C104 will respectively be in the Up condition. Thus during the fifth microsecond, leads T102 and T104 will respectively be in the Up condition. Now assume that during the fifth microsecond the plus 1 control lead 335 is in the Up condition, whereas leads 315 and 325 are respectively in the Down condition. Then the decimal value of 7 that will appear at the plus 1 output terminals 472 of the plus-and-minus-1 adder will be effectively transmitted by And circuits F101, F102 and F104 resulting in leads C101, C102 and C104 being in the Up condition during the fifth microsecond. This is accomplished as follows: when lead 335 is Up the left input terminal of each of the And circuits F101 through F108 will be Up. Thus when the 1, 2 and 4 bit output terminals of plus 1 output terminals 472 are respectively in the Up condition, And circuits F101, F102 and F104 will be energized. It will also be seen that when lead 335 is Up during the fifth microsecond, Or-Inverter circuit 316 will be energized resulting in lead 316A being Down. When lead 316A is Down during the fifth microsecond, the left input terminal of each of the And circuits B101 through B108 will be in the Down condition precluding any of said And circuits from becoming energized as a result of coincidence with any of the leads T101 through T108 (namely, T102 and T108) being in the Up condition. From the preceding discussion it is seen that during the fifth microsecond, leads C101, C102 and C104 are respectively in the Up condition. Thus during the sixth microsecond, leads T101, T102 and T104 will respectively be in the Up condition. Now if during the sixth microsecond the plus 1 control lead is again in the Up condition with leads 315 and 325 respectively in the Down condition, then during the seventh microsecond, lead T108 will be in the Up condition manifesting a decimal value of 8. The sequence of operation during the sixth microsecond will be obvious in view of the detailed discussion of the sequence of operation during the fifth microsecond.

Now assume that during the seventh microsecond during which lead T108 is in the Up condition resulting in a decimal input of 8 to the plus-and-minus-1 adder that the minus 1 control lead 325 is Up. When lead 325 is Up the center input of Or-Inverter circuit 316 is Up and thus output lead 316A of said Or-Inverter circuit is Down precluding the energization of any of the And circuits B101 through B108. Further, when lead 325 is Up the left input terminal of each of the And circuits E101 through E108 is Up. Thus, when a decimal value of 7 is manifested by the minus 1 output terminals 473 of the plus-and-minus-1 adder during the seventh microsecond, And circuits E101, E102 and E104 will be energized. Thus during the seventh microsecond, leads C101, C102 and C104 will be in the Up condition. During the eighth microsecond, as a result of the 1 microsecond delay effected by delay circuits D101, D102 and D107, leads T101, T102 and T104 will be respectively in the Up condition.

Now for purpose of explanation let it be assumed that the minus 1 control lead 325 remains in the Up condition throughout the eighth microsecond. Then it will be apparent that during the ninth microsecond a decimal value of 6 will be manifested by the Up-Down condition of leads T101 through T108. Now let it be assumed that during the ninth microsecond the minus 1 control lead remains in the Up condition thus effecting a manifestation of decimal value 5 by the Up-Down condition of leads T101 through T108 during the tenth microsecond. Now if during the tenth microsecond leads 315, 325 and 335 are respectively in the Down condition, the decimal value of 5 manifested by the Up and Down condition of leads T101 through T108 will be transmitted via And circuits B101 and B108 and delay circuits D101 and D108 to result in a manifestation of decimal value 5 by leads T101 and T104 being respectively in the Up condition during the eleventh microsecond. Now during the eleventh microsecond (or any earlier time that the desired value is manifested by the condition of leads T101 through T108) an output manifestation may be obtained from output terminal O-101 through O-108 shown in the lower portion of Fig. 3.

Now assume that during the eleventh microsecond it is desired to enter into the single position register of Fig. 3 a new decimal value, for example, 9. Thus during the eleventh microsecond read-in control lead 315 and leads 101 and 108 will be respectively in the Up condition. When lead 315 is in the Up condition, the right input terminal of Or-Inverter circuit 316 will be Up resulting in lead 316A being Down and precluding the information appearing on leads T101 through T108 during the eleventh microsecond from being transmitted by And circuits B101 through B108. Also, when lead 315 is in the Up condition, And circuits A101 and A108 are conditioned to transmit the decimal input simultaneously appearing on input leads 101 and 108. Thus during the eleventh microsecond, leads C101 and C108 will respectively be in the Up condition manifesting a decimal input of 9. During the twelfth microsecond, leads T101 and T108 will respectively be in the Up condition. In view of the detailed discussion of the plus-and-minus-1 adder earlier herein and the immediately preceding detailed discussion of the single position register, it will now be apparent to those skilled in the art how the single position register will count up or down from any decimal input of 0 through 9.

*Multi-order counting register.*—Referring to Fig. 4, there is shown a multi-order counting register that employs a plurality of single position registers of the type shown in Fig. 3. The embodiment shown in Fig. 4, will, for purposes of illustration, be thought of as a hundreds order counting register. The counting register of Fig. 4 has a units register, a tens register and a hundreds register, each labeled accordingly and interconnected via coincidence circuit means and controlled by the master control leads. The master control leads consist of master read-in control lead 415, master minus 1 control lead 425 and master plus 1 control lead 435.

Now still referring to Fig. 4, it will be seen that the master read-in control lead 415 is directly connected to read-in control leads 315 of the units register, of the tens register and the hundreds register, respectively. The master minus 1 control lead 425 is connected to the left input of And circuit 694, the left input of And circuit 594 and the minus 1 control lead 325 of the units order register. The master plus 1 control lead 435 is connected to the left input of And circuit 693, the left input of And circuit 593 and the plus 1 control lead 335 of the units order register.

Still referring to Fig. 4, it will be seen that leads T101 through T108 of the units order register are respectively connected to the four input terminals of Or-Inverter circuit 590. Thus, when a decimal value of 0 (leads T101, T102, T104 and T108 respectively in the Down condition) is stored in the units register, the output of said Or-Inverter circuit, namely, lead 591 will be Up. Lead 591 is connected to the right input terminal of And circuit 594 and the center input terminal of And circuit 694. Now again referring to the units order register, it will be seen that leads T101 and T108 are respectively connected to the input terminals of And circuit 599. Thus when a decimal value of 9 is stored within the units register (namely, leads T101 and T108 respectively in the Up condition) And circuit 599 will be energized resulting in lead 592 being in the Up condition. Lead 592 is connected to the right input of And circuit 593 and the center input of And circuit 693.

Now referring to the tens order register of Fig. 4, it will be seen that the four inputs of Or-Inverter circuit 690 are respectively connected to leads T101, T102, T104 and T108 of the tens order register. Thus inverter circuit 690 will have its output in the Up condition when a 0 value is stored in the tens order register. Lead 691, namely, the output of inverter 690 is connected to the right input of And circuit 694. Still referring to Fig. 4 and to the tens order register, it will be seen that And circuit 699 has its two inputs respectively connected to leads T101 and T108 of the tens order register. Thus, And circuit 699 will be energized and its output, namely lead 692, in the Up condition when a decimal value of 9 (significance of 90 since in the tens order) is stored in the tens order register. Lead 692 is connected to the right input of And circuit 693.

Now still referring to Fig. 4, it will be seen that: the output of And circuit 694 is connected to the minus 1 control lead 325 of the hundreds order register; that the output of And circuit 693 is connected to the plus 1 control lead 335 of the hundreds order register; that the output of And circuit 594 is connected to the minus 1 control lead 325 of the tens order register; and that the output of And circuit 593 is connected to the plus 1 control lead 335 of the tens order register.

To briefly summarize, it will now be appreciated: that lead 591 will be Up when a 0 value is present in the units order register; that lead 592 will be Up when a decimal 9 value is present in the units register; that lead 691 will be Up when a decimal value 0 is present in the tens order register; and that lead 692 will be Up when a decimal value of 9 is present in the tens order register. Thus it will be seen: that And circuit 694 will be energized when the master minus 1 control lead 425, lead 591 and lead 691 are respectively in the Up condition; that And circuit 693 will be energized when the master plus 1 control lead 435, lead 592 and lead 692 are respectively in the Up condition; that And circuit 594 will be energized when the master minus 1 control lead 425 and lead 591 are respectively in the Up condition; and that And circuit 593 will be energized when the master plus 1 control lead 435 and lead 592 are simultaneously in the Up condition.

*First example of operation of the multi-order counting register of Fig. 4.*—Assume that during a first microsecond master read-in control lead 415 is in the Up condition and a decimal value of 199 is impressed on the input terminals of the multi-order counting register of Fig. 4, i.e., during the first microsecond leads 101 and 108 respectively of the units order register are in the Up condition; leads 101 and 108 respectively of the tens order register are in the Up condition; and lead 101 of the hundreds order register is in the Up condition. With the above conditions simultaneously occurring during the first microsecond, a decimal value of 9 will be stored respectively in the units and tens order registers and a decimal value of 1 will be stored in the hundreds order register.

Now assume that during the second microsecond the master plus 1 control lead 435 is in the Up condition. When lead 435 is in the Up condition the plus 1 control lead of the units order register will be Up resulting in the plus 1 output of the plus-and-minus-1 added of the units order register being accepted and stored in said register during the second microsecond.

It will also be seen that since a decimal value of 9 is stored in the units order register during the second microsecond And circuit 599 will be energized and lead 592 will be Up during the second microsecond. When lead 592 is Up simultaneously with lead 435, then And circuit 593 will be energized during the second microsecond resulting in the plus 1 control lead 335 of the tens order register being Up and the plus 1 output of the plus-and-minus-1 adder of the tens order register being selected. With a decimal value of 9 stored in the tens order register during the second microsecond, And circuit 699 will be energized and lead 692 will be in the Up condition. Thus during the second microsecond And circuit 693 of the hundreds order register will be energized, i.e., leads 435, 592 and 692 simultaneously in the Up condition. When And circuit 693 of the hundreds order register is energized, the plus 1 control lead 335 of said register will be Up and the plus 1 output of the plus-and-minus-1 adder of said register will be selected.

Thus it will be apparent that during the third microsecond, the decimal value stored in the multi-order counting register will be increased by a decimal value of 1. That is, during the second microsecond, demical value 9 was stored in the units order register whereas during the third microsecond, a decimal value of 0 will be stored in said register. During the second microsecond, a decimal value of 9 was stored in the tens order register, whereas during the third microsecond a decimal value of 0 will be stored in said register; and a decimal value of 1 was stored in the hundreds order register during the second microsecond and a decimal value of 2 will be stored in said register during the third microsecond.

Thus during the third microsecond a decimal value of 200 is stored in the multi-order counting register. It will be appreciated that the decimal value of 200 is available at the output terminals of the novel multi-order counting register as follows: output terminals O–101 through O–108 of the units order will be respectively in the Down condition manifesting a decimal value of 0; output terminals O–201 through O–208 of the tens order will be respectively in the Down condition manifesting a decimal value of 0; and output terminal O–302 of the hundreds order will be in the Up condition manifesting a decimal value of 2.

Now assume that during the third and a fourth microsecond the master control leads 415, 425 and 435 are respectively in the Down condition, then it will be apparent, that as explained in conjunction with the detailed explanation of the single order register of Fig. 3, that the value stored in the units, tens and hundreds order registers of Fig. 4 will be retained in storage.

Now assume that during the fifth microsecond the master plus 1 control lead 435 is in the Up condition with a decimal value of 200 stored in the multi-order counting register. When lead 435 is in the Up condition, the plus 1 control lead 335 of the units order register will be Up thus selecting the plus 1 output of the plus-and-minus-1 adder of the units order register. Since a 0 value is stored in the units order register during the fifth microsecond, lead 592 will be Down precluding And circuits 593 and 693 from being energized at this time. (It will also be noted that under the conditions of this example lead 692 will be Down when a 0 value is stored during the fifth microsecond in the tens order register.) Thus when lead 435 is Up during the fifth microsecond, under the conditions of this example, it will only result in the decimal value stored in the units register being increased by a value of 1. The value stored, namely, a 0 in the tens order register and a 2 in the hundreds order register, will be retained.

Therefore during the sixth microsecond, the multi-order counting register will have stored therein a decimal value of 201. Now for purposes of explanation, let it be assumed that during the sixth, seventh, eighth, ninth, tenth, eleventh, twelfth and thirteenth microseconds the master plus 1 control lead 435 remains in the Up condition. Then from the preceding discussion it will be apparent that the plus 1 output of the plus-and-minus-1 adder of the units order register will be successively selected. It will be appreciated that during the fourteenth microsecond a decimal value of 209 is stored in the multi-order counting register, i.e., a decimal value of 2 is stored in the hundreds order register, a decimal value of 0 is stored in the tens order register, and a decimal value of 9 is stored in the units order register.

Now let it be assumed that the master plus 1 control lead 435 remains in the Up condition during the fourteenth microsecond. It will also be appreciated that during the fourteenth microsecond And circuit 599 will be energized and lead 592 will be in the Up condition. Thus with master plus 1 control lead 435 in the Up condition simultaneously with lead 592 being in the Up condition, And circuit 593 will be energized and the plus 1 control lead 335 of the tens order register will be Up during the fourteenth microsecond (as will the plus 1 control lead 335 of the units order register). Therefore, during the fifteenth microsecond the decimal value stored in the units order register will be 0; the decimal value stored in the tens order register will be 1; and the decimal value stored in the hundreds order register will be 2; i.e., a decimal value of 210 stored in the multi-order counting register.

Now assume that during the fifteenth microsecond the master minus 1 control lead 425 is in the Up condition. Now it will be appreciated that with a decimal value of 0 stored in the units order register, Or-Inverter circuit 590 will have its output, namely, lead 591, in the Up condition. Thus when lead 425 is in the Up condition, the minus 1 control lead of the units order will be Up and since lead 591 is Up simultaneously with lead 425, And circuit 594 will be energized and the minus 1 control lead 325 of the tens order register will be Up. (With a 1 stored in the tens order register, Or-Inverter circuit 690 will have its output, namely, lead 691, in the Down condition precluding And circuit 694 from being energized.) Thus during the fifteenth microsecond, the minus 1 output of the plus-and-minus-1 adder of the units and tens order registers, respectively, will be selected. Therefore during the sixteenth microsecond a decimal value of 9 will be stored in the units order register; a decimal value of 0 will be stored in the tens order register; and a decimal value of 2 will be stored in the hundreds order register, i.e., a decimal value of 209 is stored in the multi-order counting register of Fig. 4.

It will be apparent to those skilled in the art that at any subsequent microsecond the multi-order counting register of Fig. 4 may be reset (i.e., zero value stored therein) by simply impressing an Up pulse of at least one microsecond duration on master read-in control lead 415.

*Second example of operation of the multi-order counting register of Fig. 4.*—Assume that during a first microsecond, master read-in control lead 415 is in the Up condition and a decimal value of 600 is impressed on the input terminals of the multi-order counting register of Fig. 4, i.e., during the first microsecond all of the input leads of the units order register are in the Down condition; all of the input leads of the tens order register are in the Down condition; and leads 102 and 104 of the hundreds order register are respectively in the Up condition. With the above conditions simultaneously occurring during the first microsecond, a decimal value of 6 will be stored in the hundreds order register and a decimal value of 0 will be stored in both the tens and units order registers. Now assume that during the second microsecond, the master minus 1 control lead 425 is in the Up condition. Leads 591 and 691 respectively will be in the Up condition during the second microsecond since a 0 value is stored in both the units and tens order registers. Thus when lead 425 is in the Up condition, the minus 1 control lead 325 of the units order will be Up, And circuit 594 will be energized (leads 591 and 425 simultaneously in the Up condition) resulting in the minus 1 control lead of the tens order register being Up, and And circuit 694 will be energized (leads 591, 691 and 425 being simultaneously in the Up condition) resulting in the minus 1 control lead 325 of the hundreds order register being Up. Thus, it is seen that during the second microsecond, the minus 1 control lead 325 of each of the three registers is in the Up condition. Hence in each of the three registers, the minus 1 output sum of the plus-and-minus-1 adder will be selected resulting in a 9 being stored in the units and tens order registers respectively, and a 5 being stored in the hundreds order register.

Now it will be appreciated that in the absence of one of the three master control leads assuming the Up condition, the decimal value of 599 will remain in storage in the multi-order counting register. During the third, or any subsequent microsecond an output manifestation of the decimal value 599 may be obtained from the output terminals of the multi-order counting register.

*Third example of operation of the multi-order counting register of Fig. 4.*—Assume that during a first microsecond master read-in control lead 415 is in the Up condition and a decimal value of 710 is impressed on the input terminals of the multi-order counting register of Fig. 4, i.e., during the first microsecond all of the input leads of the units order register are in the Down condition; lead 101 of the tens order register is in the Up condition; and leads 101, 102 and 104 of the hundreds order register are respectively in the Up condition. With the above conditions simultaneously occurring during the first microsecond, a decimal value of 0 will be stored in the units order register, a decimal value of 1 will be stored in the tens order register, and a decimal value of 7 will be stored in the hundreds order register. Now assume that during the second microsecond the master minus 1 control lead 425 is in the Up condition. Since a decimal value of 0 is stored in the units order register, lead 591 will be in the Up condition. Thus when lead 425 is in the Up condition during the second microsecond, the minus 1 control lead 325 of the units order register and the minus 1 control lead 325 of the tens order register will be respectively in the Up condition (And circuit 594 is energized since both leads 425 and 591 are simultaneously in the Up condition). Thus during the second microsecond, the minus 1 output sum of the plus-and-minus-1 adder of both the units and tens order registers will be selected. It is now apparent that during the third microsecond, the decimal value 709 will be stored in the multi-order counting register, that is, a decimal value of 9 will be stored in the units order register, a decimal value of 0 in the tens order register, and a decimal value of 7 in the hundreds order register. It will be apparent that in the absence of any one of the three master control leads assuming the Up condition, the decimal value of 709 will remain in storage in the multi-order counting register; and that the decimal value of 709 will be repeatedly manifested at the output terminals of the multi-order counting register.

To briefly summarize, it will be apparent that And circuits 593 and 594 and And circuits 693 and 694 are utilized in conjunction with Or-Inverter 690, And circuit 699, Or-Inverter 590 and And circuit 599 as coincidence circuit means interconnecting the various orders of the multi-order counting regiser so that the register may properly count in unit decimal steps from 0 through 1000. It will be apparent to those skilled in the art, that the novel invention herein disclosed is not limited to a third order register. A counting register having any number of orders may be constructed to practice the invention herein disclosed and claimed.

Further, the invention herein disclosed and claimed is not limited to a multi-order counting register of the radix or base 10. It will be apparent to those skilled in the art that by properly interconnecting coincidence circuit means a binary, quinary or other radix may be the base of the novel counting register.

It will also be apparent that the novel counting register will count up or down, that the microsecond timing period is arbitrarily chosen, and that any period (through judicious design) may be employed.

Further, it will be apparent that through additional circuitry a counting register may be designed so as to selectively count by unit, decade or higher order steps.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A plus-and-minus-1 adder capable of accepting an input electrical manifestation representing any integer input of 0 through 9 expressed in binary coded decimal notation, parallel by binary bit, and rendering a first electrical manifestation representing a first output equal in magnitude to said input plus 1 simultaneously with a second electrical manifestation representing a second output equal in magnitude to said input minus 1, said first and second outputs being respectively expressed in binary coded decimal notation, parallel by binary bit, said plus-and-minus-1 adder, including in combination: a first group of input terminals for accepting said input electrical manifestation representing any integer input of 0 through 9 expressed in binary coded decimal notation, parallel by binary bit; a first group of output terminals for electrically manifesting said first output in binary coded decimal notation, parallel by binary bit; a second group of output terminals for electrically manifesting said second output in binary coded decimal notation, parallel by binary bit, and concurrently with the electrical manifestation of said first output at said first group of output terminals; and circuit means consisting of coincidence circuit means interconnecting said first group of input terminals with said first and second groups of output terminals.

2. A plus-and-minus-1 adder capable of accepting an input electrical manifestation representing any integer decimal input of 0 through 9 expressed in binary-decimal notation, parallel by binary bit, and thereafter simultaneously electrically manifesting a first output equal in decimal value to said integer decimal input plus 1 and a second output equal in decimal value to said integer decimal input minus 1, the electrical manifestations of said first and second outputs being respectively expressed in binary-decimal notation, parallel by binary bit, said plus-and-minus 1 adder including in combination: a first group of binary-decimal input terminals for accepting said input electrical manifestations expressed in binary-decimal notation parallel by binary bit; a first group of binary-decimal output terminals for electrically manifesting said first output, equal in value to said integer decimal input plus 1, and expressed in binary-decimal notation, parallel by binary bit; a second group of binary-decimal output terminals for electrically manifesting said second output, equal in value to said integer decimal input minus 1, and expressed in binary-decimal notation, parallel by binary bit, and the electrical manifestation at said second group of binary-decimal output terminals occurring simultaneously with the electrical manifestation appearing at said first group of binary-decimal output terminals; and coincidence circuit means interconnecting said first group of input terminals, said first group of output terminals and said second group of output terminals.

3. A plus-and-minus 1 adder as claimed in claim 2 further characterized in that said coincidence circuit means consists of the interconnection of Inverter circuit means, And circuit means, and Or circuit means.

4. A plus-and-minus-1 adder including in combination: first means for accepting an input electrical manifestation representative of a decimal input expressed in binary coded decimal notation, parallel by binary bit; and second means, responsive to said first means, for simultaneously manifesting a first electrical manifestation representative of a first output, equal in decimal value to said decimal input plus 1, and a second electrical manifestation representative of a second output, equal in decimal value to said decimal input minus 1, and said first and second outputs being respectively manifested in binary coded decimal notation, parallel by binary bit.

5. A plus-and-minus-1 adder including in combination: first means for accepting an input electrical manifestation representative of an input expressed in binary coded decimal notation, parallel by binary bit; second means responsive to said first means for manifesting electrically a first output expressed in binary coded decimal notation, parallel by binary bit, and equal to said input plus a fixed quantity; and third means responsive to said first means, operative simultaneously with said second means, for manifesting electrically a second output expressed in binary coded decimal notation, parallel by binary bit, and equal to said input minus said fixed quantity, whereby said first and second outputs are simultaneously manifested in response to said input.

6. A plus-and-minus adder including in combination: first means for accepting an input electrical manifestation of any decimal input of 0 through 9 expressed in binary-decimal notation, parallel by binary bit; and second means, cooperating with said first means, for simultaneously electrically manifesting a first output and a second output, said first and second outputs being respectively equal in magnitude to 1 plus said decimal input and 1 minus said decimal input, and said first and second outputs being expressed in binary-decimal notation, parallel by binary bit.

7. A plus-and-minus adder including in combination: first means for accepting an input electrical manifestation representing a decimal input expressed in binary coded decimal notation, parallel by binary bit; second means, responsive to said first means, for electrically manifesting a first output having a magnitude less than said decimal input by a predetermined decimal amount and expressed in binary coded decimal notation, parallel by binary bit; and third means, responsive to said first means and operative simultaneously with said second means, for electrically manifesting a second output having a magnitude greater than said decimal input by a predetermined decimal amount and expressed in binary coded decimal notation, parallel by binary bit, whereby said first and second outputs are simultaneously manifested.

8. A plus-and-minus adder including in combination: first means for accepting an input electrical manifestation representative of a decimal input expressed in binary coded decimal notation, parallel by binary bit; second means, responsive to said first means, for electrically manifesting a first output expressed in binary coded decimal notation, parallel by binary bit, and said first output being equal in magnitude to said decimal input plus a first fixed decimal quantity; and third means, responsive to said first means, cooperating and operative simultaneously with said second means, for electrically manifesting a second output expressed in binary coded decimal notation, parallel by binary bit, and said second output being equal in magnitude to said decimal input minus a second fixed decimal quantity, whereby said first and second outputs are simultaneously manifested.

9. A storage register capable of accepting an input electrical manifestation of an input decimal quantity expressed in binary coded decimal notation, parallel by binary bit, and subsequently rendering an output electrical manifestation of an output decimal quantity expressed in binary coded decimal notation, parallel by binary bit, and said output decimal quantity being equal in magnitude to said input decimal quantity plus 1 or said input decimal quantity minus 1, said register including in combination: first means for accepting said input electrical manifestation of said input decimal quantity expressed in binary coded decimal notation, parallel by binary bit; second means, responsive to said first means, and consisting of the interconnection of a plus-and-minus 1 adder having a plus 1 and a minus 1 output, coincidence circuit means and delay circuit means; control means for controlling said second means so as to effect the selection of the plus 1 or the minus 1 output of said plus-and-minus-1 adder of said second means; and output means coupled to said second means for rendering said output electrical manifestation representative of said output decimal quantity in binary coded decimal notation, parallel by binary bit.

10. A storage register capable of accepting an input electrical manifestation representative of a first decimal input quantity expressed in binary coded decimal notation, parallel by binary bit, and adding 1 to said decimal input quantity a successive number of times to thus arrive at an output electrical manifestation representative of a second decimal quantity expressed in binary coded decimal notation which said register is capable of retaining in storage, said register including in combination: first means for accepting said input electrical manifestation representative of said first decimal input quantity expressed in binary coded decimal notation, parallel by binary bit; delay circuit means; second means, responsive to said first means and cooperating with said delay circuit means, for generating an electrical manifestation representative of said second decimal quantity expressed in binary coded decimal notation, parallel by binary bit, said second decimal quantity being equal in magnitude to the sum of the magnitudes of said first decimal input quantity and an integer decimal quantity; third means cooperating with said delay circuit means for retaining an electrical manifestation of said second decimal quantity in storage; and fourth means, coupled to said delay circuit means, for rendering said output electrical manifestation representative of said second decimal quantity and expressed in binary coded decimal notation, parallel by binary bit.

11. A storage register capable of accepting an input electrical manifestation representative of a first decimal input quantity expressed in binary coded decimal notation, parallel by binary bit, and subtracting 1 from said decimal input quantity a successive number of times to thus arrive at an output electrical manifestation representative of a second decimal quantity expressed in binary coded decimal notation which said register is capable of retaining in storage, said register including in combination: first means for accepting said input electrical manifestation representative of said first decimal input quantity expressed in binary coded decimal notation, parallel by binary bit; delay circuit means; second means, responsive to said first means and cooperating with said delay circuit means, for generating an electrical manifestation representative of said second decimal quantity expressed in binary coded decimal notation, parallel by binary bit, said second decimal quantity being equal in magnitude to the difference in magnitude of said first decimal input quantity and an integer decimal quantity; third means cooperating with said delay circuit means for retaining an electrical manifestation of said second decimal quantity in storage; and fourth means, coupled to said delay circuit means, for rendering said output electrical manifestation representative of said second decimal quantity and expressed in binary coded decimal notation, parallel by binary bit.

12. A storage register capable of accepting an input electrical manifestation representative of a first decimal input quantity expressed in binary coded decimal notation, parallel by binary bit, and controllable to count either up or down from said decimal input quantity and thus arrive at an output electrical manifestation representative of a second decimal quantity expressed in binary coded decimal notation which said register is capable of retaining in storage, said register including in combination: first means for accepting said input electrical manifestation representative of said first decimal input quantity expressed in binary coded decimal notation, parallel by binary bit; delay circuit means; second means including a plus-and-minus-1 adder having a plus 1 and a minus 1 output; controllable means interconnecting said first means, said second means, and said delay circuit means for selecting the plus 1 or minus 1 output of said plus-and-minus 1 adder in any sequence for any successive number of times to arrive at an electrical manifestation representative of said second decimal quantity; third means cooperating with said delay circuit means for retaining said electrical manifestation representative of said second decimal quantity in storage; and fourth means, coupled to said delay circuit means, for rendering as an output, said output electrical manifestation representative of said second decimal quantity and expressed in binary coded decimal notation, parallel by binary bit.

13. A storage register capable of accepting an input electrical manifestation representative of a first decimal input quantity expressed in binary coded decimal notation, parallel by binary bit, and at a subsequent time rendering an output electrical manifestation representative of an output decimal quantity expressed in binary coded decimal notation, parallel by binary bit and said output decimal quantity having a magnitude equal to the magnitude of said first decimal input quantity, greater than the magnitude of said first decimal input quantity by a predetermined integer amount, or less than the magnitude of said first decimal input quantity by a predetermined integer amount, said register including in combination: input means for accepting said input electrical manifestation representative of said first decimal input quantity expressed in binary coded decimal notation, parallel by binary bit; first means coupled to said input means, for rendering an output electrical manifestation representative of an output decimal quantity having a greater magnitude than said first decimal input quantity and expressed in binary coded decimal notation, parallel by binary bit; second means cooperating with, and operative simultaneously with said first means, for rendering an output electrical manifestation representative of an output decimal quantity having a lesser magnitude than said first decimal input quantity and expressed in binary coded decimal notation, parallel by binary bit; controllable means for controlling said first and second means and selecting the output of either said first or said second means; third means, cooperating with said controllable means, for retaining in storage the selected output of said first or said second means; and output means, cooperating with said third means, for electrically manifesting as an output of said register, said selected output in binary coded decimal notation, parallel by binary bit.

14. A storage register including in combination: first means for accepting an electrical manifestation representative of a first input decimal quantity expressed in binary coded decimal notation, parallel by binary bit; controllable means, responsive to said first means, for successively reducing the magnitude of said first input decimal quantity in uniform amounts so as to arrive at an electrical manifestation representative of a second decimal quantity expressed in binary coded decimal notation; storage means, cooperating with said controllable means, for storing said electrical manifestation of said second decimal quantity; and output means for rendering an output electrical manifestation representative of said second decimal quantity and expressed in binary coded decimal notation, parallel by binary bit.

15. A storage register of the type claimed in claim 14 further characterized in that additional means is provided for rendering an output electrical manifestation of an integer decimal quantity having a magnitude less than said first input decimal quantity and greater than said second decimal quantity, and expressed in binary coded decimal notation, parallel by binary bit.

16. A storage register including in combination: first means for accepting an electrical manifestation representative of a first input decimal quantity expressed in binary coded decimal notation, parallel by binary bit; controllable means responsive to said first means for successively increasing the magnitude of said input decimal quantity in uniform amounts so as to arrive at an electrical manifestation representative of a second decimal quantity expressed in binary coded decimal notation; storage means, cooperating with said controllable means, for storing said electrical manifestation of said second decimal quantity; and output means for rendering an output electrical manifestation representative of said second decimal quantity and expressed in binary decimal notation, parallel by binary bit.

17. A storage register of the type claimed in claim 16 further characterized in that additional means is provided for rendering an output electrical manifestation of an integer decimal quantity having a magnitude greater than said first input decimal quantity and less than said second decimal quantity, and expressed in binary coded decimal notation, parallel by binary bit.

18. A multi-order counting register capable of accepting an input electrical manifestation representative of a first multi-order decimal input quantity expressed in binary coded decimal notation, parallel by binary bit and decimal order, increasing the magnitude of said decimal input quantity in integer amounts so as to arrive at an electrical manifestation representative of a second multi-order decimal quantity expressed in binary coded decimal notation, and retaining said second multi-order decimal quantity in storage, said register including in combination: first means for accepting said input electrical manifestation representative of said first multi-order decimal input quantity expressed in binary coded decimal notation, parallel by binary bit and decimal order; controllable means, responsive to said first means, for increasing said first multi-order decimal input quantity in integer amounts to arrive at said electrical manifestation representative of said second multi-order decimal quantity expressed in binary coded decimal notation; storage means, cooperating with said controllable means, for retaining in storage said electrical manifestation representative of said second multi-order decimal quantity; and output means, cooperating with said storage means, for rendering an output electrical manifestation representative of said second multi-order decimal quantity and expressed in binary coded decimal notation, parallel by binary bit and decimal order.

19. A multi-order counting register as claimed in claim 18 further characterized by the provision of means for rendering an output electrical manifestation representative of said first multi-order decimal input quantity expressed in binary coded decimal notation, parallel by binary bit and decimal order, or any integer decimal quantity expressed in binary coded decimal notation, parallel by binary bit and decimal order, and whose magnitude is greater than the magnitude of said first multi-order decimal input quantity and less than, or equal to, the magnitude of said second multi-order decimal quantity.

20. A multi-order counting register capable of accepting an input electrical manifestation representative of a first multi-order decimal input quantity expressed in binary coded decimal notation, parallel by binary bit and decimal order, decreasing the magnitude of said decimal input quantity in integer amounts so as to arrive at an electrical manifestation representative of a second multi-order decimal quantity expressed in binary coded decimal notation, and retaining said second multi-order decimal quantity in storage, said register including in combinaiton: first means for accepting said input electrical manifestation representative of said first multi-order decimal input quantity expressed in binary coded decimal notation, parallel by binary bit and decimal order; controllable means, responsive to said first means, for decreasing said first multi-order decimal input quantity in integer amounts to arrive at said electrical manifestation representative of said second multi-order decimal quantity expressed in binary coded decimal notation; storage means, cooperating with said controllable means, for retaining in storage said electrical manifestation representative of said second multi-order decimal quantity; and output means, cooperating with said storage means, for rendering an output electrical manifestation representative of said second multi-order decimal quantity and expressed in binary coded decimal notation, parallel by binary bit and decimal order.

21. A multi-order counting register as claimed in claim 20 further characterized by the provision of means for rendering an output electrical manifestation representative of said first multi-order decimal input quantity expressed in binary coded decimal notation, parallel by binary bit and decimal order, or any integer decimal quantity expressed in binary coded decimal notation, parallel by binary bit and decimal order, and whose magnitude is less than the magnitude of said first multi-order decimal input quantity and greater than, or equal to, the magnitude of said second multiorder decimal quantity.

22. A multi-digit counting register capable of accepting an input electrical manifestation representative of a first multi-digit decimal input quantity expressed in binary coded decimal notation, parallel by binary bit and decimal order, and counting either up or down from said first multi-digit decimal input quantity, said register including in combination: first means for accepting said input electrical manifestation representative of said first multi-digit decimal input quantity expressed in binary coded decimal notation, parallel by binary bit and decimal order; controllable means, responsive to said first means, for counting up or down, or a sequence thereof, from said first multi-digit decimal input quantity; and output means, cooperating with said controllable means, for rendering an output electrical manifestation representative of a decimal quantity expressed in binary coded decimal notation, parallel by binary bit and decimal order, and whose magnitude is equal to, less than, or greater than, the magnitude of said first multi-digit decimal input quantity.

23. A multi-order counting register capable of accepting an input electrical manifestation representative of a first multi-order decimal input quantity expressed in binary coded decimal notation parallel by binary bit and decimal order, and counting either up or down from said first multi-digit decimal input quantity and thus arriving at an electrical manifestation representative of a second multi-order decimal quantity expressed in binary coded decimal notation, parallel by binary bit and decimal order, which said register is adapted to retain in storage, said register including in combination: input means for accepting said input electrical manifestation representative of said first multi-order decimal input quantity expressed in binary coded decimal notation parallel by binary bit and decimal order; controllable counting means, responsive to said input means, for counting either up or down from said first multi-order decimal input quantity to arrive at said electrical manifestation representative of said second multi-order decimal quantity; storage means, connected to said controllable counting means, for storing said electrical manifestation representative of said second multi-order decimal quantity; and output means, coupled to said storage means, for rendering an output electrical manifestation representative of said second multi-order decimal quantity and expressed in binary coded decimal notation, parallel by binary bit and decimal order.

24. A multi-order counting register capable of accepting an input electrical manifestation representative of a first multi-order decimal input quantity expressed in binary coded decimal notation, parallel by binary bit and decimal order, counting either up or down from said first multi-order decimal input quantity and thus arriving at an electrical manifestation representative of a second multi-order decimal quantity expressed in binary coded decimal notation, which said register is adapted to retain in storage, said register including in combination: input means for accepting said input electrical manifestation representative of said first multi-order decimal input quantity expressed in binary coded decimal notation, parallel by binary bit and decimal order; a plurality of plus-and-minus adder means; control means, coupled to said input means and said plurality of plus-and-minus adder means, for controlling said plurality of plus-and-minus adder means to effect counting either up or down from said first multi-order decimal input quantity to arrive at said electrical manifestation representative of said second multi-order decimal input quantity; logical circuit means coupled to said adder means for accomplishing simultaneous carry between the different orders of said multi-order counting register; and output means, coupled to said control means, for rendering an output electrical manifestation representative of said second multi-order decimal quantity and expressed in binary coded decimal notation, parallel by binary bit and decimal order.

References Cited in the file of this patent

UNITED STATES PATENTS

| Number | Name | Date |
|---|---|---|
| 2,500,294 | Phelps | Mar. 14, 1950 |
| 2,534,287 | Marsh | Dec. 19, 1950 |
| 2,536,916 | Dickenson | Jan. 2, 1951 |
| 2,539,623 | Heising | Jan. 30, 1951 |
| 2,656,106 | Stabler | Oct. 20, 1953 |
| 2,656,460 | McMillan | Oct. 20, 1953 |
| 2,671,171 | Rench | Mar. 2, 1954 |
| 2,735,005 | Steele | Feb. 14, 1956 |

OTHER REFERENCES

"A Functional Description of the Edvac," University of Pennsylvania, Nov. 1, 1949.